United States Patent
Sueyoshi et al.

(10) Patent No.: US 6,932,269 B2
(45) Date of Patent: Aug. 23, 2005

(54) PASS-CODE IDENTIFICATION DEVICE AND PASS-CODE IDENTIFICATION METHOD

(75) Inventors: Masahiro Sueyoshi, Kanagawa (JP); Fumio Kubono, Tokyo (JP); Akihiko Yamagata, Kanagawa (JP); Masachika Sasaki, Kanagawa (JP); Toshiharu Takemura, Kanagawa (JP); Takashi Matsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/362,819

(22) PCT Filed: Jun. 25, 2002

(86) PCT No.: PCT/JP02/06321

§ 371 (c)(1),
(2), (4) Date: Aug. 28, 2003

(87) PCT Pub. No.: WO03/003292

PCT Pub. Date: Jan. 9, 2003

(65) Prior Publication Data

US 2004/0046017 A1 Mar. 11, 2004

(30) Foreign Application Priority Data

Jun. 27, 2001 (JP) .................................... 2001-195398

(51) Int. Cl.⁷ .............................................. G06K 5/00
(52) U.S. Cl. ................. 235/382; 235/375; 235/380; 235/382.5; 235/435
(58) Field of Search ............................. 235/382, 375, 235/380, 382.5, 435, 436, 437

(56) References Cited

U.S. PATENT DOCUMENTS

| | | | |
|---|---|---|---|
| 4,766,293 A | * 8/1988 | Boston | 705/41 |
| 5,034,596 A | * 7/1991 | Utsunomiya | 235/380 |
| 5,497,411 A | * 3/1996 | Pellerin | 455/411 |
| 5,594,227 A | * 1/1997 | Deo | 235/380 |
| 5,608,902 A | 3/1997 | Iijima | 395/616 |
| 5,910,652 A | * 6/1999 | Kuriyama | 235/492 |
| 6,059,191 A | * 5/2000 | Sedlak et al. | 235/492 |
| 6,226,199 B1 | 5/2001 | Ichikawa | 365/185.04 |
| 6,273,335 B1 | * 8/2001 | Sloan | 235/382 |

FOREIGN PATENT DOCUMENTS

| | | |
|---|---|---|
| JP | 62-148820 | 9/1987 |
| JP | 64-54165 | 4/1989 |
| JP | 07-160547 | 6/1995 |
| JP | 10-97468 | 4/1998 |
| JP | 10-097468 | 4/1998 |
| JP | 2001-87480 | 3/2001 |

* cited by examiner

Primary Examiner—Steven S. Paik
(74) Attorney, Agent, or Firm—Sonnenschein, Nath & Rosenthal LLP (57) ABSTRACT

A pass-code identification device includes a communication unit for communicating with an external apparatus, a data-holding unit for holding data, a pass-code-holding unit for holding a pass-code, a pass-code comparison unit for comparing an input pass-code received through the communication unit with the pass-code held by the pass-code holding unit, and a flow control unit for controlling a result of comparison of the pass-codes in accordance with a condition for comparing the pass-codes. The condition determines whether or not it is necessary to judge pass-codes. The condition also determines whether or not a pass-code is required to change a pass-code from valid status to invalid status and vice versa.

11 Claims, 8 Drawing Sheets

PASS-CODE IDENTIFICATION DEVICE AND PASS-CODE IDENTIFICATION METHOD

CROSS-REFERENCE TO RELATED APPLICATIONS

This application claims priority to PCT Application No. PCT/JP02/06321, filed on Jun. 25, 2002, which claims priority to Japanese Application No. 2001-19539, filed on Jun. 27, 2001, both of which are incorporated herein by reference to the extent permitted by law.

BACKGROUND OF THE INVENTION

The present invention relates to a pass-code identification device and a pass-code identification method, which are used for controlling accesses to predetermined information by collation of pass-codes. More particularly, the present invention relates to a pass-code identification device and a pass-code identification method, which are used for controlling accesses made by an external apparatus by collation of pass-codes.

To put it in detail, the present invention relates to a pass-code identification device and a pass-code identification method, which are used for controlling accesses made by an external apparatus such as a reader/writer to an internal memory of the pass-code identification device such as an IC card by collation of pass-codes. More particularly, the present invention relates to a pass-code identification device and a pass-code identification method, which are used for determining whether or not access-right control based on a pass-code is required.

There has been conceived and put to practical use a variety of apparatus using a pass-number and/or a password for verifying a user and for authenticating process. (In general, "a pass-number" is defined as a string or a combination of numbers each having a value in the range 0 to 9 whereas a password is defined as a string or a combination of alphabetical characters. In this specification, "a pass-code" is a generic technical term for the pass-number and the password.)

When the user of a cash card uses the cash card at a bank or an other financial institution, a cash dispenser typically urges the user to enter a pass-number or a password as a means for authenticating the user. The cash dispenser then carries out a withdrawal operation after verifying that the user has entered a correct pass-number or a correct password.

There are other applications of a pass-code. Examples of the other applications are an operation to enter a pass-code to a safety box, which is installed in a hotel or an other lodging facility, in order to open the safety box, an operation to enter a password to a computer at a log-in, and an operation to enter a pass-code to an information terminal in order to request the terminal to conceal information.

Traditionally, in a storage medium such as magnetic stripes on a cash card for a bank, only a storage area that is usable for the particular bank is provided. Thus, inputting a pass-number or a password is no more than accessing to this storage area. That is to say, the user needs to selectively use a plurality of cash cards for different purposes and/or different applications.

By the way, in recent years, non-contact IC cards have been becoming popular. For example, a cash dispenser or an IC-card reader/writer installed at the entrance of a concert hall, a station, or the like, is capable of making an access to the IC card without contact. At the same time, the user enters a pass-number or a password to the IC-card reader side, and the IC card and the IC-card reader/writer collate the entered pass-number or the entered password with the fetched pass-number or the fetched password for verifying the user and for authenticating process. Then, if the verifying the user and authenticating process success, typically, an application stored in the IC card can be used. Examples of the application stored in the IC card include electronic money and an electronic ticket.

In addition, in recent years, by virtue of improvements of miniaturization technologies, an IC card having a storage space with a relatively large size is introduced and has been becoming popular. In the conventional cash card or the like, only one storage area for one application can be provided. It is thus necessary for the user to carry a plurality of IC cards for different purposes and/or different applications. With an IC card having a storage space with a large size, however, a plurality of applications can be stored in such an IC card. For example, one IC card can be used for storing two or more applications such as electronic money for electronic financial settlements and electronic tickets each used for entering a specific concert hall. In this way, an IC card can be used for a variety of purposes and/or applications.

Furthermore, it is possible to mount an IC card having a memory function with a large storage capacity (or an IC chip implementing a semiconductor IC card) on a portable telephone or a portable terminal. By carrying about such a portable terminal, the user is capable of exchanging electronic value information with an external apparatus such as mainly an apparatus used for electronic financial settlements.

The conventional cash card is used for storing only one application (described above). Thus, by holding one pass-number or one password in magnetic stripes on a cash card, securities of all cards can be controlled.

In the case of an IC card having a memory function capable of storing a plurality of applications or a portable terminal including such an IC card (or an IC chip) mounted thereon, on the other hand, it is necessary to control an access right for each application. This is because, if accesses can be made to all applications on an IC card by using only one pass-code, the security of the applications will deteriorate significantly in case of loss or theft of the IC card.

In addition, after an IC card's memory area permitting accesses by inputting a pass-code has once be invalidated, the user must reenter the pass-code once more in order to restore the IC card to the validated state again. Thus, the IC card is bad usability.

Furthermore, basically, only the owner of an IC card determines whether or not it is necessary to carry out an authentication process based on a pass-code before an access to information stored in the IC card can be made. Thus, there is no room for a person in charge of the system administration to intervene in the control of the security of the IC card.

SUMMARY OF THE INVENTION

It is thus an object of the present invention to provide a pass-code identification device and a pass-code identification method that are capable of appropriately controlling accesses made by an external apparatus to the pass-code identification device by collation of pass-codes.

It is thus another object of the present invention to provide a pass-code identification device and a pass-code identification method that are capable of appropriately controlling accesses made by an external apparatus such a reader/writer to an internal memory of the pass-code identification device such as an IC card by collation of pass-codes.

It is thus a further object of the present invention to provide a pass-code identification device and a pass-code identification method that allow both the owner of an IC card and a person in charge of the administration of card services to appropriately determine whether or not access-right control based on a pass-code is required.

In accordance with a first aspect of the present invention addressing the problems described above, there is provided a pass-code identification device, which is used for controlling accesses made by an external apparatus by collation of pass-codes. The pass-code identification device includes:

a communication unit for communicating with the external apparatus;

a data-holding unit for holding data;

a pass-code-holding unit for holding a pass-code;

a pass-code judgment unit for forming a judgment as to whether or not an input pass-code received from the external apparatus matches the pass-code held by the pass-code holding unit;

a condition-setting unit for setting a condition for forming the judgment on the input pass-code; and a flow control unit for controlling accesses made by the external apparatus to the data-holding unit through the communication unit in accordance with the condition for forming the judgment on the input pass-code, which is a condition set by the condition-setting unit.

The pass-code identification device provided in accordance with the first aspect of the present invention can be used for example as an IC card for controlling accesses to the IC card's memory having a relatively large storage capacity by collation of pass-codes.

In this case, "the IC card" is generally a cartridge, which includes an IC chip and an antenna, having about the same size as a credit card. The IC chip itself can also be used as a device embedded in a portable terminal such as a portable telephone or a PDA or embedded in an other information-processing apparatus.

The IC card can also be used by inserting the card into an information-processing apparatus. An IC chip or an IC card can be used as a prepaid device having a function related to value information such as electronic money and electronic tickets. The function of an IC chip or an IC card is referred to as "an application".

The memory area of an IC card is typically used for storing value information such as electronic money and electronic tickets for more than one application. For each of the applications, a pass-code such as a pass-number or a password is set. Pass-codes are collated with each other to control a right of an access to an application. To put it in detail, the IC card collates a pass-code entered to the IC card by the user with a pass-code stored in the application in advance and, only if the pass-codes match each other, does the IC card permit an access to the application.

In the pass-code identification device provided in accordance with the first aspect of the present invention, the condition-setting unit determines whether or not the pass-code judgment unit needs to form the judgment on the input pass-code. Then, the flow control unit permits an access made by the external apparatus to the data-holding unit through the communication unit if the condition-setting unit determines that the pass-code judgment unit does not need to form the judgment on the input pass-code. In addition, if the condition-setting unit determines that the pass-code judgment unit needs to form the judgment on the input pass-code and the pass-code judgment unit outputs a judgment result revealing that the input pass-code matches the pass-code held by the pass-code-holding unit, the flow control unit also permits an access made by the external apparatus to the data-holding unit through the communication unit. In order to permit an access made by the external apparatus to data held by the data-holding unit the flow control unit puts the data-holding unit in a state of being connected to the communication unit.

In addition, the condition-setting unit can be provided with a first judgment-necessity-holding means for holding information indicating whether or not the pass-code judgment unit needs to form the judgment on the input pass-code; a second judgment-necessity-holding means for holding information indicating whether or not an input pass-code is required for changing the first judgment-necessity-holding means from a state of holding information indicating that the pass-code judgment unit needs to form the judgment on the input pass-code to a state of holding information indicating that the pass-code judgment unit does not need to form the judgment on the input pass-code; and a third judgment-necessity-holding means for holding information indicating whether or not an input pass-code is required for changing the first judgment-necessity-holding means from a state of holding information indicating that the pass-code judgment unit does not need to form the judgment on the input pass-code to a state of holding information indicating that the pass-code judgment unit needs to form the judgment on the input pass-code.

Thus, the condition-setting unit is capable of setting a condition for forming the judgment on the input pass-code in accordance with the information held by the first judgment-necessity-holding means, the information held by the second judgment-necessity-holding means, and the information held by the third judgment-necessity-holding means. That is to say, it is possible to set a change of a pass-code from a valid state to an invalid state and from an invalid state to a valid state by putting conditions for entering a pass-code in a variety of combinations. For example, in order to change a pass-code from an invalid state to a valid state in an operation to change a pass-code, it is not necessary to enter a pass-code. In order to change a pass-code from a valid state to an invalid state in an operation to change a pass-code, on the other hand, it is necessary to enter a pass-code.

In addition, it is possible to provide the pass-code identification device's implementation wherein the pass-code-holding unit holds a plurality of pass-codes; the pass-code judgment unit forms a judgment as to whether or not an input pass-code received from the external apparatus matches each of the pass-codes held by the pass-code holding unit; and the flow control unit permits an access made by the external apparatus to the data-holding unit through the communication unit if the condition-setting unit determines that the pass-code judgment unit needs to form the judgment on the input pass-code and the pass-code judgment unit outputs a judgment result revealing that the input pass-code matches all the pass-codes held by the pass-code-holding unit.

With this implementation, some external apparatuses each used for inputting a pass-code can each be assigned to an individual user utilizing this system while some other external apparatuses each used for inputting a pass-code can each be assigned to an operator (such as a person in charge of card services). In this way, the functions of pass-codes can be controlled in accordance with a judgment formed by an operator. For example, the system can be set to forcibly require a pass-code input without regard to the wills of the individual users.

In addition, it is also possible to provide the pass-code identification device's other implementation wherein the pass-code-holding unit holds a plurality of pass-codes each associated with a memory area in the data-holding unit the pass-code judgment unit forms a judgment as to whether or not an input pass-code received from the external apparatus through the communication unit matches each of the pass-codes held by the pass-code holding unit; and the flow control unit permits an access made by the external apparatus to a specific memory area through the communication unit if the condition-setting unit determines that the pass-code judgment unit needs to form the judgment on the input pass-code and the pass-code judgment unit outputs a judgment result revealing that the input pass-code matches one of the stored pass-codes that is associated with the specific memory area.

It is thus possible to make an access to a memory area of a memory space in the data-holding unit if the memory area is allocated to a pass-code matching an input pass-code.

By providing the external apparatus with a card reader, the external apparatus is capable of making an access to the IC chip through a radio interface. Also in this case, rights of accesses to a memory area such as that of an IC chip are controlled by collation of pass-codes. After a locked state of an information-processing apparatus including an embedded IC chip is unlocked by entering a pass-code to the information-processing apparatus, a radio connection between the information-processing apparatus and the external apparatus can be established and an access to the memory area is permitted. As an alternative, after a radio connection between the IC chip embedded in the information-processing apparatus and the external apparatus is established, access rights are controlled on the basis of pass-codes entered to the external apparatus.

In addition, in accordance with a second aspect of the present invention, there is provided a pass-code identification method, which is used for controlling accesses made by an external apparatus to predetermined data by collation of pass-codes. The pass-code identification method includes a pass-code judgment step of forming a judgment as to whether or not an input pass-code received from the external apparatus matches a pass-code set for the predetermined data; a condition-setting step of setting a condition for forming the judgment on the input pass-code; and a flow control step of controlling accesses made by the external apparatus to the predetermined data in accordance with the condition for forming the judgment on the input pass-code, which is a condition set at the condition-setting step.

The pass-code identification method provided in accordance with the second aspect of the present invention can be adopted for example in an IC card for controlling accesses to the IC card's memory having a relatively large storage capacity by collation of pass-codes.

The memory area of an IC card is typically used for storing value information such as electronic money and electronic tickets for more than one application. For each of the applications, a pass-code such as a pass-number or a password is set. Pass-codes control a right of an access. To put it in detail, the IC card collates a pass-code entered to the IC card by the user with a pass-code stored in the application in advance and, only if the pass-codes match each other, does the IC card permit an access to the application.

In the pass-code identification method provided in accordance with the second aspect of the present invention, the condition-setting step is executed also to determine whether or not it is necessary to execute the pass-code judgment step of forming the judgment on the input pass-code. Then, at the flow control step, an access made by the external apparatus to the predetermined data is permitted if a result of execution of the condition-setting step indicates that the pass-code judgment step of forming the judgment on the input pass-code is not necessary. An access made by the external apparatus to the predetermined data is also permitted at the flow control step if a result of execution of the condition-setting step indicates that the pass-code judgment step of forming the judgment on the input pass-code is necessary and an output result of the judgment formed at the pass-code judgment step reveals that the input pass-code matches a pass-code set for the predetermined data.

The condition-setting step may include a first judgment-necessity-holding step of managing information indicating whether or not it is necessary to execute the pass-code judgment step of forming the judgment on the input pass-code; a second judgment-necessity-holding step of managing information indicating whether or not an input pass-code is required for changing information from a value indicating that it is necessary to execute the pass-code judgment step of forming the judgment on the input pass-code to a value indicating that it is not necessary to execute the pass-code judgment step of forming the judgment on the input pass-code; and a third judgment-necessity-holding step of managing information indicating whether or not an input pass-code is required for changing information from a value indicating that it is not necessary to execute the pass-code judgment step of forming the judgment on the input pass-code to a value indicating that it is necessary to execute the pass-code judgment step of forming the judgment on the input pass-code.

In this case, at the condition-setting step, a condition for forming the judgment on the input pass-code is set in accordance with the information managed by the first judgment-necessity-holding step, the information managed by the second judgment-necessity-holding step, and the information managed by the third judgment-necessity-holding step. That is to say, it is possible to set a change of a pass-code from a valid state to an invalid state and from an invalid state to a valid state by putting conditions for entering a pass-code in a variety of combinations. For example, in order to change a pass-code from an invalid state to a valid state in an operation to change a pass-code, it is not necessary to enter a pass-code. In order to change a pass-code from a valid state to an invalid state in an operation to change a pass-code, on the other hand, it is necessary to enter a pass-code.

In addition, a plurality of pass-codes may be set for predetermined data to be accessed. In this case, at the pass-code judgment step, a judgment as to whether or not an input pass-code received from the external apparatus matches each of the pass-codes set for predetermined data is formed. Furthermore, at the flow control step, an access made by the external apparatus to the predetermined data is permitted if a result of execution of the condition-setting step determines that it is necessary to execute the pass-code judgment step of forming the judgment on the input pass-code and an output result of the judgment formed at the pass-code judgment step reveals that the input pass-code matches all the pass-codes set for predetermined data.

With this implementation, some external apparatuses each used for inputting a pass-code can each be assigned to an individual user utilizing this system while some other external apparatuses each used for inputting a pass-code can each be assigned to an operator such as a person in charge. In this way, the functions of pass-codes can be controlled in accordance with a judgment formed by an operator. For example, the system can be set to forcibly require a pass-code input without regard to the wills of the individual users.

In addition, a plurality of pass-codes may be set, each being associated with a memory area. In this case, at the pass-code judgment step, a judgment as to whether or not an input pass-code received from the external apparatus matches each of the pass-codes each associated with a memory area is formed. Furthermore, at the flow control step, an access made by the external apparatus to a specific memory area is permitted if a result of execution of the condition-setting step determines that it is necessary to execute the judgment on the input pass-code and an output result of the judgment formed at the pass-code judgment step reveals that the input pass-code matches one of the stored pass-codes that is associated with the specific memory area.

It is thus possible to make an access to a memory area of a memory space in the data-holding unit if the memory area is allocated to a pass-code matching an input pass-code.

The present invention's other objects, features, and merits will become more apparent from a later detailed explanation of a preferred embodiment of the present invention with reference to accompanying diagrams.

DETAILED DESCRIPTION OF THE PRESENTLY PREFERRED EMBODIMENTS

A preferred embodiment of the present invention is described by referring to accompanying diagrams as follows.

Figure 1:
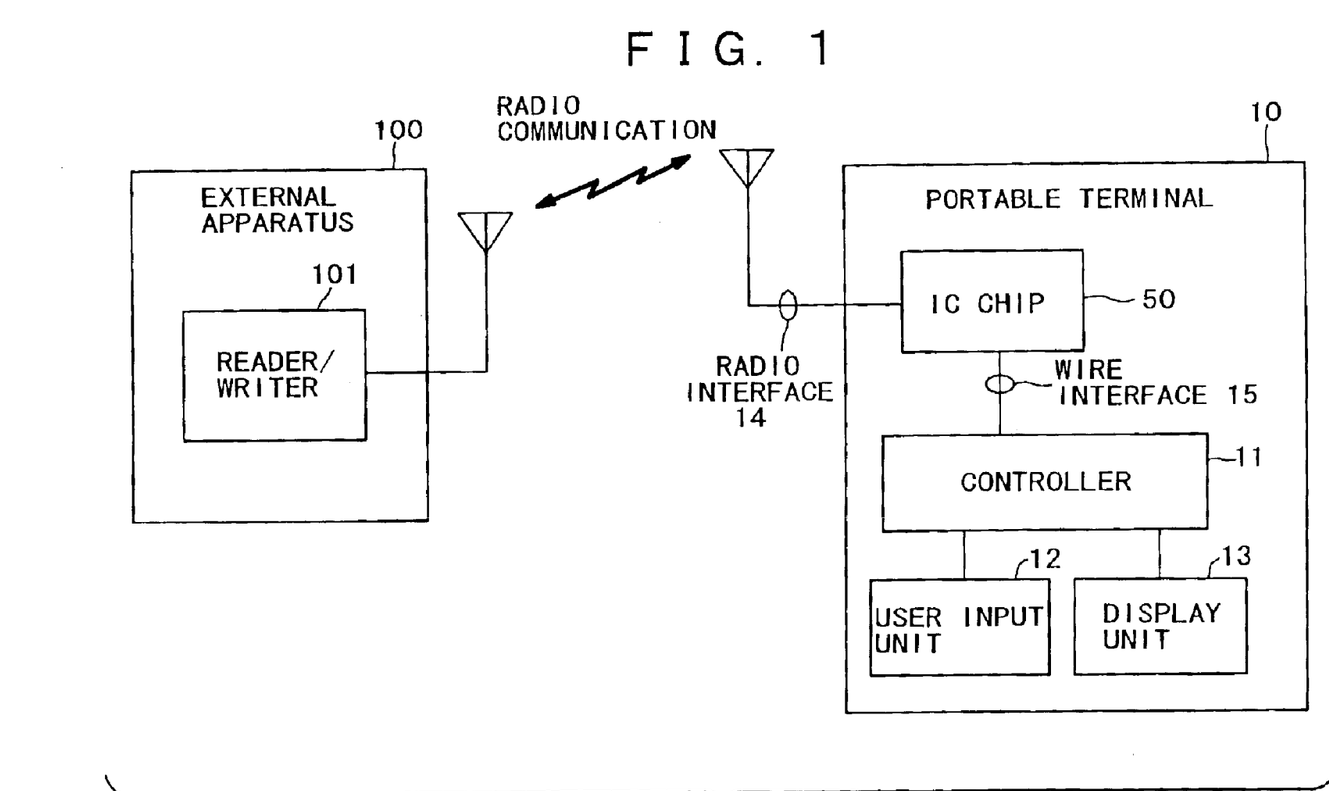
FIG. 1 is a diagram showing a model of the hardware configuration of a portable terminal 10 implemented by an embodiment of the present invention.

FIG. 1 shows a model of the hardware configuration of a portable terminal 10 implemented by an embodiment of the present invention. Designed into a small size and a small weight like a portable telephone, a PDA (Personal Digital Assistant) or the like, the portable terminal 10 is an information-processing terminal that can be carried about by the user all the time.

The portable terminal 10 includes an IC card 50, a controller 11, a user input unit 12 and a display unit 13. Used for carrying out radio communication with an external apparatus, the IC card 50 includes a memory function. The controller 11 controls internal operations of the portable terminal 10 in an integrated manner. The user input unit 12 is composed of components such as keys and buttons used by the user for entering a variety of character strings such as mainly a pass-number and a password and entering commands. The display unit 13 is typically an LCD (Liquid Crystal Display) for displaying a result of a process on a screen. It is needless to say that, in order to implement native functions of the portable terminal 10, the portable terminal 10 may be provided also with peripheral devices and circuit components other than those shown in the figure.

The controller 11 includes components such as a CPU (Central Processing Unit), a ROM (Read-Only Memory), and a RAM (Random Access Memory), which are incorporated in a single unit. By executing program codes stored in advance in the ROM, the controller 11 controls a variety of operations in the portable terminal 10.

The IC card 50 has a radio interface 14 for establishing a radio connection with the external apparatus 100 and a wire interface 15 for establishing a wire connection with the controller 11 employed in the portable terminal 10. As the radio interface 14, it is possible to employ a contact interface standard defined by ISO 7816 or a radio interface standard defined by ISO 14443. A technique of connection between the IC chip 50 and the external apparatus 100 will be described later.

The IC chip 50 typically adopts a technology developed for a non-contact IC card. In accordance with this technology, the IC chip 50 is driven by an electromagnetic wave generated by the external apparatus 100 through the radio interface 14. In other words, with the user unholding the portable terminal 10 over the external apparatus 100, the electromagnetic wave generated by the external apparatus 100 does not reach the portable terminal 10 anymore. In this state, the IC chip 50 ceases to operate. In addition, in this embodiment, the right of an access to the inside of the IC chip 50 is revoked in response to an event in which the electromagnetic wave is interrupted.

Furthermore, the IC card 50 provided by the present invention has a memory area having a relatively large size. Such a memory area is brought by the miniaturization technology and the like. The memory area is implemented by a semiconductor memory, magnetic stripes, or an other writable and readable storage medium. One or more applications are assigned to the memory area. Examples of the application are pieces of value information such as mainly electronic money and electronic tickets.

In order to protect this type of value information from misuse and thefts, a pass-code such as a pass-number or a password is set for each of the applications. In this way, an access right can be controlled for each application. For example, a pass-code input by way of the radio interface 14 or the wire interface 15 is compared with a pass-code set for an application. If the pass-code input by way of the radio interface 14 or the wire interface 15 matches the pass-code set for the application, an access to the application is granted (will be described later).

The external apparatus 100 is an apparatus utilizing an application assigned to the memory area in the IC card 50. Typically, the external apparatus 100 includes a reader/ writer 101, which establishes a connection with the IC chip 50 by applying a technology developed for a non-contact IC card. In addition, the external apparatus 100 also has circuit components and peripheral devices for carrying out arithmetic processing of specific jobs and an input unit and an output unit for interactive input with the user (which are not shown in the figure).

The external apparatus 100 includes an apparatus for using electronic money, an apparatus for processing electronic value information, and an apparatus for verifying a user and for authenticating process. The example of the apparatus for using electronic money is an ATM (Automatic Teller Machine) installed at a bank. The example of the apparatus for processing electronic value information is an apparatus using electronic tickets at a gate of a concert hall and a ticket wicket of a station or an airport. The example of the apparatus for verifying a user and for authenticating process is a safety box installed at a hotel or a lodging facility.

In accordance with a system configuration shown in FIG. 1, the user enters a pass-code to the portable terminal 10 via the user input unit 12 to unlock a locked state. In some cases, the pass-code entered by the user is displayed on the display unit 13 for confirmation before being supplied to the IC chip 50 embedded in the portable terminal 10 by way of the wire interface 15. Then, the IC chip 50 collates the pass-code entered by the user with pass-codes set for applications or for directories in memory areas. The user is then given a right of an access to a memory area allocated to the matched application or a directory. As an alternative, accesses to the applications are controlled on the basis of pass-codes, which are received from the external apparatus 100 after a radio connection is established between the IC chip 50 employed in the portable terminal 10 and the external apparatus 100.

Figure 2:
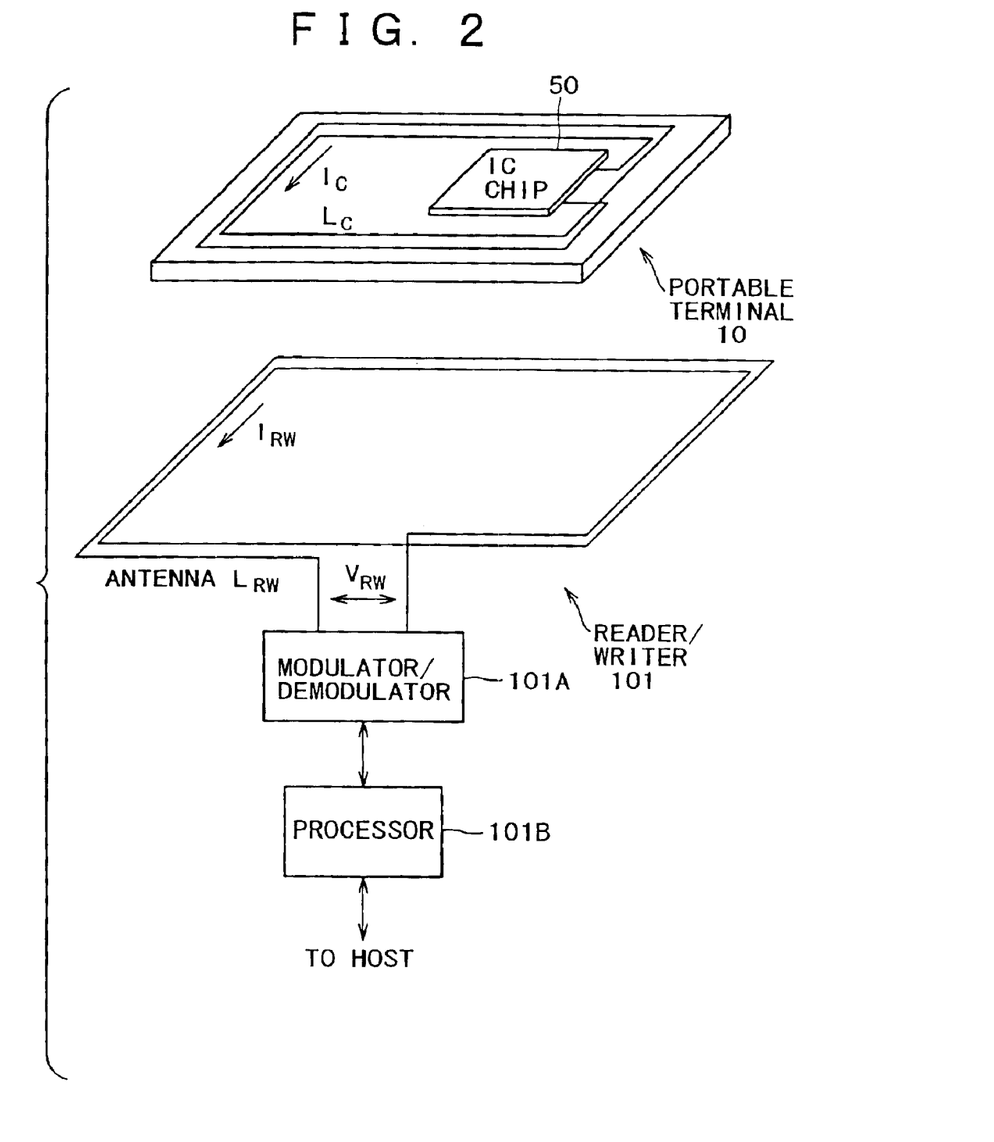
FIG. 2 is an explanatory diagram conceptually showing a mechanism of radio communication based on electromagnetic induction between a reader/writer 101 and an IC chip 50.

Radio communications between the reader/writer 101 and the IC card 50 are accomplished on the basis of typically a principle of electromagnetic induction. FIG. 2 is an explanatory diagram conceptually showing a mechanism of the radio communication between the reader/writer 101 based on electromagnetic induction and the IC card 50. As shown in the figure, the reader/writer 101 has an antenna $L_{RW}$ implemented as a loop coil. A magnetic field is generated in areas surrounding the antenna $L_{RW}$ by a current $I_{RW}$ flowing through the antenna $L_{RW}$. On the other hand, a loop coil $L_c$ is electrically formed in an area surrounding the IC card 50. An induction voltage induced by the magnetic field generated by the loop antenna $L_c$ of the reader/writer 101 side appears at the terminals of the loop coil $L_c$ at the IC chip 50 side and applied to the terminals of the IC card 50, which are connected to the terminals of the loop coil $L_c$.

The degree of coupling between the antenna $L_{RW}$ of the reader/writer 101 and the loop coil $L_c$ of the IC chip 50 varies in dependence on the positional relation between the antenna $L_{RW}$ of the reader/writer 101 and the loop coil $L_c$ of the IC chip 50. The antenna $L_{RW}$ of the reader/writer 101 and the loop coil $L_c$ of the IC chip 50 can be interpreted as a system functioning as a transformer. That is to say, the reader/writer 101 and the IC chip 50 can be expressed model shown in FIG. 3.

Figure 3:
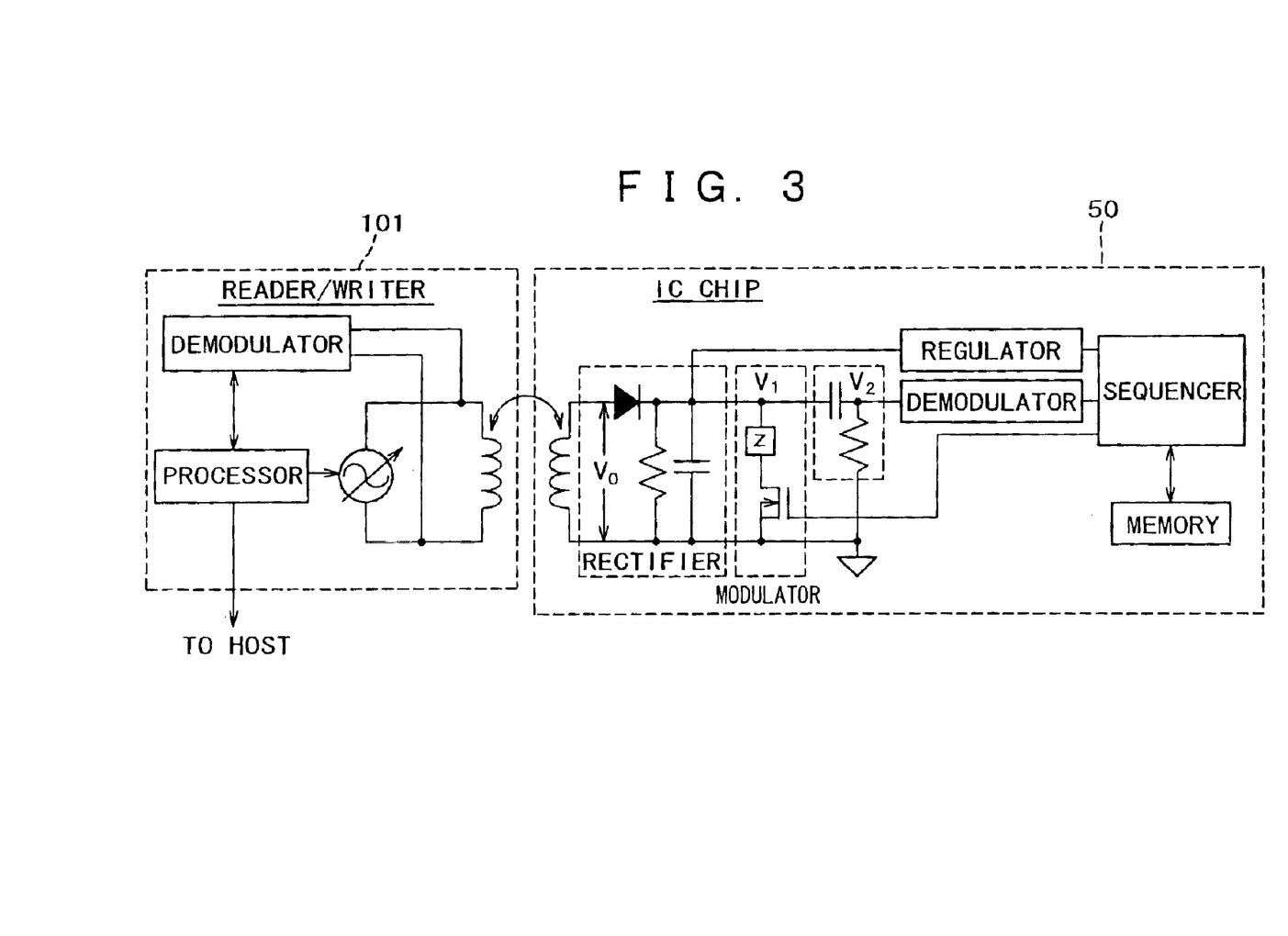
FIG. 3 is a diagram showing a transformer model representing a system including the reader/writer 101 and the IC card 50.

The reader/writer 101 modulates a current $I_{RW}$ flowing through the antenna $L_{RW}$ in order to modulate a voltage $V_o$ induced in the loop coil $L_c$ of the IC card 50. The modulation of the current $I_{RW}$ and the modulation of the induced voltage $V_o$ are used for transmitting data from the reader/writer 101 to the IC card 50. The transmitted data includes a pass-code for getting a right of an access to an application and value information for an application. The pass-code is a pass-number or a password entered by the user to the external apparatus 100. Examples of the value information are electronic money and an electronic ticket.

In addition, the IC chip 50 has a load-switching function for changing a load between the terminals of the loop coil $L_c$ in accordance with data to be transmitted as a response to the reader/writer 101. When the load between the terminals of the loop coil $L_c$ is varied, the impedance between the terminals of the antenna employed in the reader/writer 101 also changes. When the impedance between the terminals of the antenna employed in the reader/writer 101 changes, a current $I_{RW}$ flowing through the antenna $L_{RW}$ and a voltage $V_{RW}$ appearing between the terminals of the antenna $L_{RW}$ also change. By demodulating the changing current $I_{RW}$ or the changing voltage $V_{RW}$, the reader/writer 101 is capable of obtaining the data transmitted as a response by the IC card 50. The data obtained by the external apparatus 100 from the IC card 50 includes value information such as electronic money and an electronic ticket, which are provided by applications.

Figure 4:
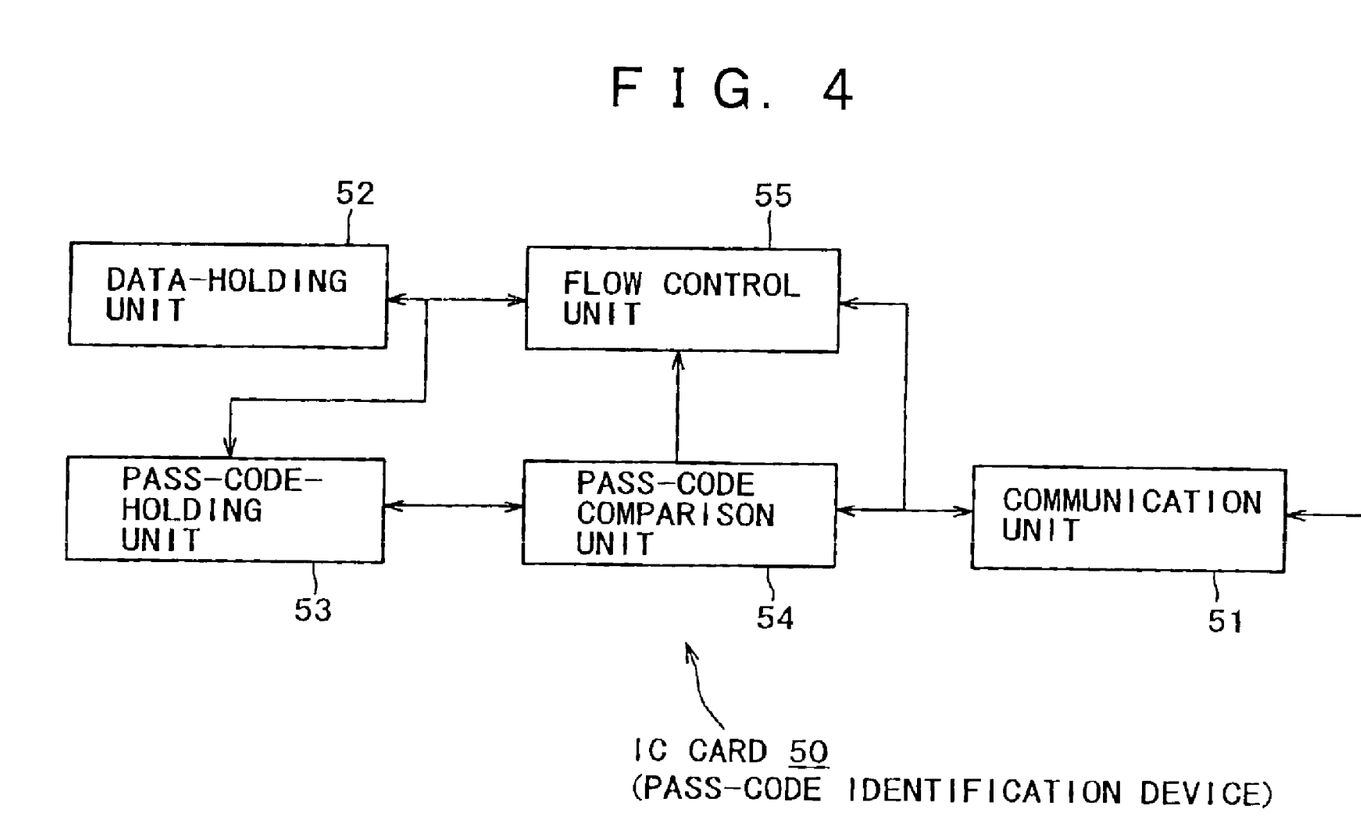
FIG. 4 is an explanatory diagram showing a model of a functional configuration of the IC card 50 embedded in a portable terminal 10 implemented by the embodiment.

FIG. 4 is an explanatory diagram showing a model of a functional configuration of the IC card 50 embedded in the portable terminal 10 implemented by the embodiment.

The IC card 50 serves as the pass-code identification device provided by the present invention. As shown in the figure, the IC card 50 has a communication unit 51, a data-holding unit 52, a pass-code-holding unit 53, a pass-code comparison unit 54, and a flow control unit 55. The communication unit 51 communicates with components outside of the IC chip 50 such as portable terminal 10 and the external apparatus 100. The data-holding unit 52 holds data (including value information such as electronic money and an electronic ticket) for applications. The pass-code-holding unit 53 holds pass-codes used for controlling accesses to the data-holding unit 52. The pass-code-comparison unit 54 collates a pass-code input from the communication unit 51 with pass-codes held by the pass-code-holding unit 53. The flow control unit 55 controls the output of the pass-code comparison in accordance with a condition for the pass-codes comparison.

The communication unit 51 forms at least one of the radio interface 14 and the wire interface 15, which are shown in FIG. 1. When an electrical serial-communication means is carrying out a communication, for example, a specific meaning is given to a series of serial-communication data, making it possible to perform various kinds of processing. A variety of methods can be assumed for a method of transmitting data in the serial communication system. In this embodiment, data is exchanged in byte units as shown in FIG. 5.

Figure 5:
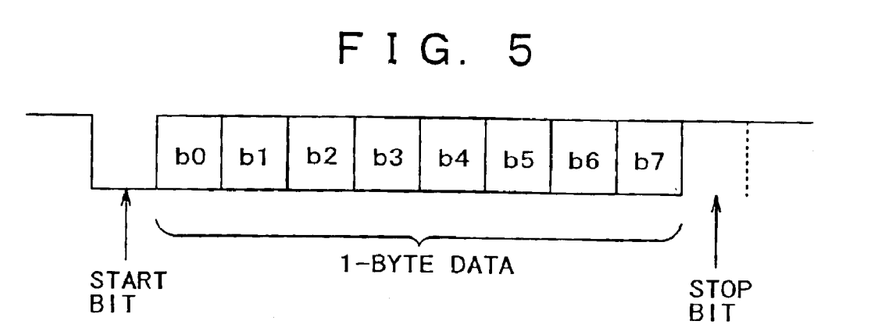
FIG. 5 is a diagram showing a model of one-byte data transmitted and received through a communication unit 51.

In FIG. 5, the one-byte data that is always preceded by a start bit. The start bit is then followed by the eight bits of the data, which is followed by a stop bit. The length of each bit is fixed and determined in advance by the data-transmitting and receiving parties.

Figure 6:
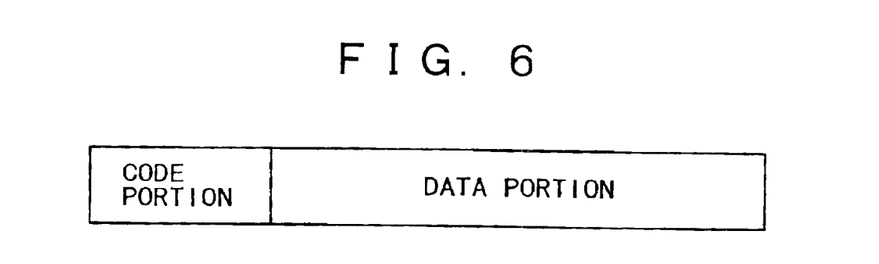
FIG. 6 is a diagram showing a model of the configuration of a packet including pieces of one-byte data.

FIG. 6 shows a model of the configuration of a packet including pieces of one-byte data. As shown in the figure, the first half of the packet is a code portion whereas the second half of the packet is a data portion (or a payload). The code portion describes the data for the meaning of the packet. The data portion is attached if the data (the data main portion) added to the code portion is required.

Figure 7:
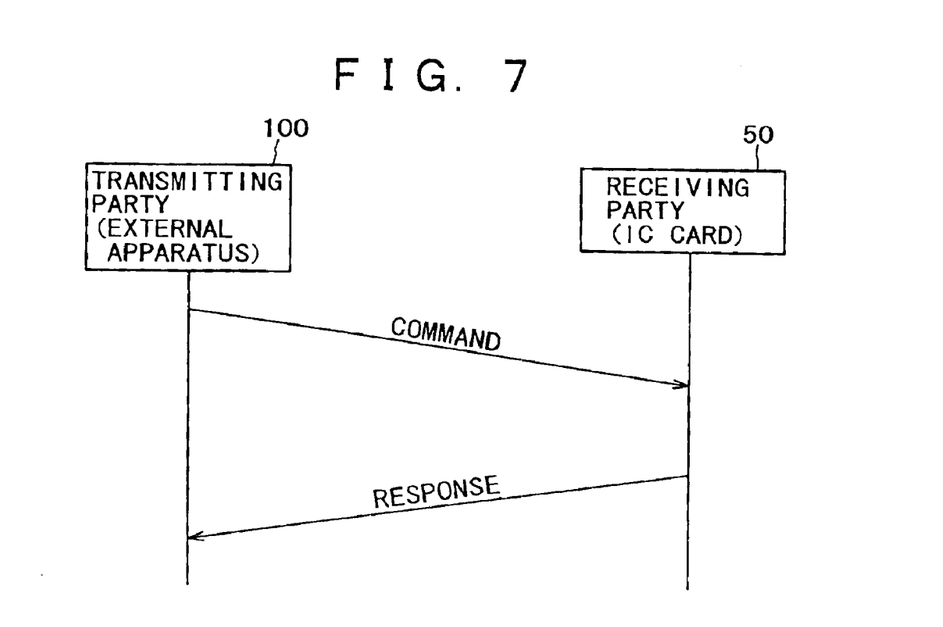
FIG. 7 is a diagram showing a basic sequence of a packet exchange between the data-transmitting and receiving parties.

FIG. 7 shows a basic sequence of a packet exchange between the data-transmitting and receiving parties. In this embodiment, the external apparatus 100 serves as the data-transmitting party while the IC chip 50 used as the pass-code identification device serves as the data-receiving party.

A packet can be a command requesting an action from the data-transmitting party to the data-receiving party, or a response transmitted by the data-receiving party to the data-transmitting party as a result of the action to the command. Commands and responses used in this embodiment are shown in Table 1.

TABLE 1

| Command (External apparatus to identification device) | | Response (identification device to external apparatus) | | |
|---|---|---|---|---|
| Code portion | Data portion | Code portion | Data portion | Meaning |
| 10 h | Pass-code | 12 h | OK/NG | Pass-code input |
| 18 h | Pass-code | 1A h | OK/NG | Pass-code c hange |
| 20 h | Read location | 22 h | OK (Read-out data)/NG | Read-out data |
| 30 h | Written data and write location | 32 h | OK/NG | Written data |
| 40 h | Flag value | 42 h | OK/NG | Valid/Invalid Change |
| 50 h | Flag value | 52 h | OK/NG | Invalid −> Valid Change |
| 60 h | Flag value | 54 h | OK/NG | Valid −> Invalid Change |

A command's code portion of 10h means that the data portion includes a pass-code to be supplied to the IC card 50 serving as the pass-code identification device. As a result of interpretation of this code portion by the communication unit 51, the data portion following the code portion is supplied to the pass-code-comparison unit 54.

The pass-code-comparison unit 54 compares the data portion received from the communication unit 51 with pass-codes held by the pass-code-holding unit 53. If one of the pass-codes matches the data portion, the pass-code-comparison unit 54 generates a match output. The flow control unit 55 has a function to limit transfers of data between the data-holding unit 52 and the communication unit 51.

Figure 8:
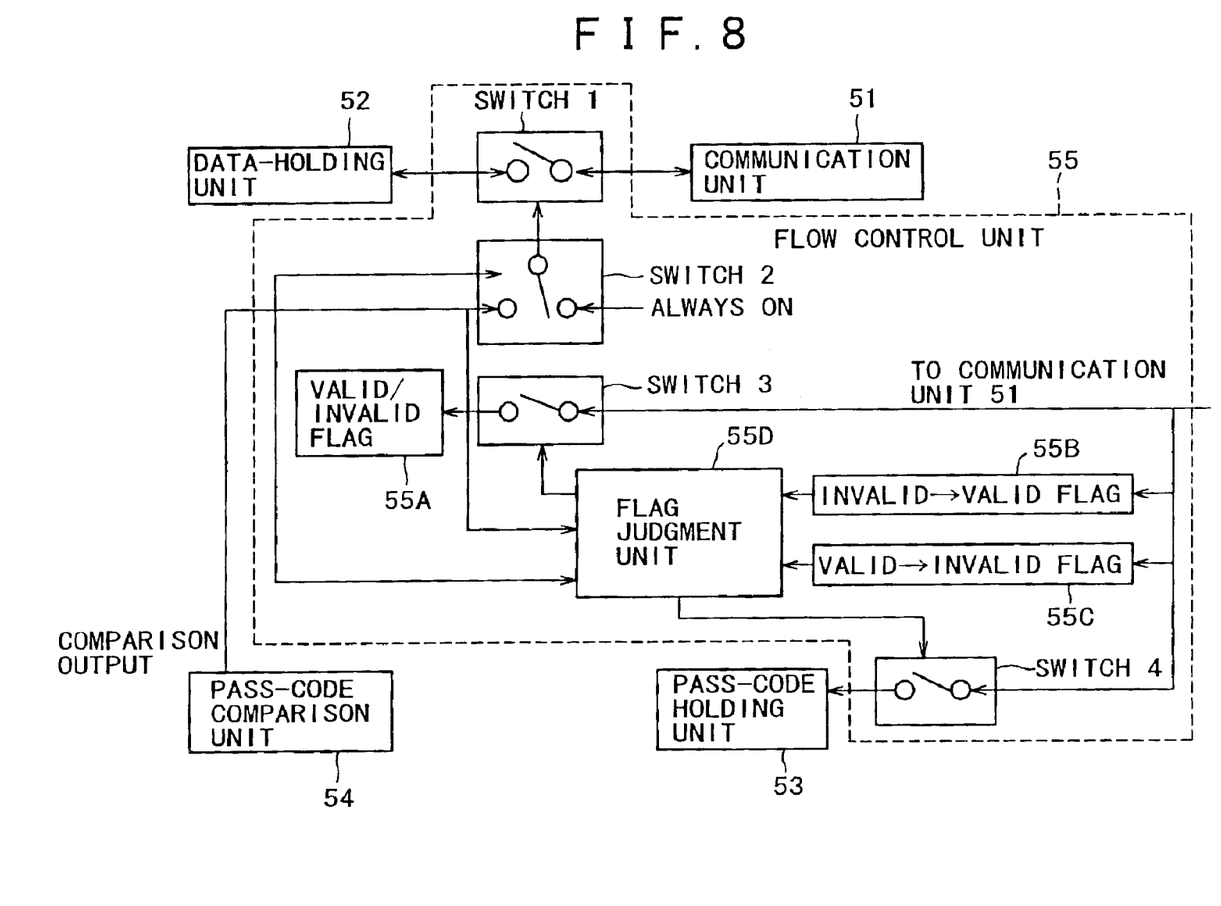
FIG. 8 is a diagram showing the configuration of a flow control unit 55.

FIG. 8 shows the configuration of the flow control unit 55.

A valid/invalid flag 55A is a flag determining whether a transmission line between the data-holding unit 52 and the communication unit 51 is connected state or unconnected state according to a comparison output by the pass-code-comparison unit 54.

If the valid/invalid flag 55A is set at a valid value of 1, a switch 2 is connected to the comparison output. If the pass-code-comparison unit 54 outputs a match comparison result, the output of transmitted to a switch 1, and the switch 1 is put in an ON state to connect the communication unit 51 to the data-holding unit 52 by the transmission line. In this state, the external apparatus 100 is capable of making an access to the data-holding unit 52 by way of the communication unit 51. If the pass-code-comparison unit 54 outputs a mismatch comparison result, on the other hand, the output of transmitted to the switch 1, and the switch 1 is put in an OFF state to disconnect the communication unit 51 from the data-holding unit 52 by the transmission line. In this state, the external apparatus 100 is not capable of making an access to the data-holding unit 52 by way of the communication unit 51.

If the valid/invalid flag 55A is set at an invalid value of 0, on the other hand, the switch 2 is put in an ON state all the time. The switch 1 is put in an ON state all the time to connect the communication unit 51 to the data-holding unit 52 by a transmission line independently of a comparison result output by the pass-code-comparison unit 54.

The reader is expected to fully understand that, by using the valid/invalid flag 55A, the function of the pass-code-comparison can be suppressed if the function is not required.

An invalid-to-valid flag 55B is a flag that can be changed by a command's code portion of 50h. The invalid-to-valid flag 55B is a flag selecting whether or not an entered pass-code is required to match a stored pass-code in order to change the valid/invalid flag from an invalid value of 0 to a valid value of 1 by using a command's code portion of 40h to be described later. If the invalid-to-valid flag 55B is set at 1, the valid/invalid flag 55A is set at 0 indicating an invalid result of pass-code comparison and the pass-code-comparison unit 54 generates a match output, the flag judgment unit 55D puts the switch 3 in an ON state, allowing the valid/invalid flag 55A to be changed from the communication unit 51. If the invalid-to-valid flag is set at 0, however, the flag judgment unit 55D puts the switch 3 in an ON state allowing the valid/invalid flag 55A to be changed from the communication unit 51.

Thus, if the invalid-to-valid flag 55B is set at 1, an entered pass-code is required to match a stored pass-code in order to change the valid/invalid flag 55A from an invalid value to a valid value. If the invalid-to-valid flag 55B is set at 0, on the other hand, an entered pass-code is not required to match a stored pass-code in order to change the valid/invalid flag 55A from an invalid value to a valid value.

On the other hand, a valid-to-invalid flag 55C is a flag that can be changed by a command's code portion of 60h. The valid-to-invalid flag 55C is a flag selecting whether or not an entered pass-code is required to match a stored pass-code in order to change the valid/invalid flag 55A from a valid value of 1 to an invalid value of 0 by using a command's code portion of 40h to be described later. If the valid-to-invalid flag 55C is set at 1, the valid/invalid flag 55A is set at 1 indicating a valid result of pass-code comparison and the pass-code-comparison unit 54 generates a match output, the flag judgment unit 55D puts the switch 3 in an ON state, allowing the valid/invalid flag 55A to be changed from the communication unit 51. If the valid-to-invalid flag is set at 0, the flag judgment unit 55D puts the switch 3 in an ON state allowing the valid/invalid flag 55A to be changed from the communication unit 51.

Thus, if the valid-to-invalid flag 55C is set at 1, an entered pass-code is required to match a stored pass-code in order to change the valid/invalid flag 55A from a valid value to an invalid value. If the valid-to-invalid flag 55C is set at 0, on the other hand, an entered pass-code is not required to match a stored pass-code in order to change the valid/invalid flag 55A from a valid value to an invalid value.

As described above, the operations to change the state of the valid/invalid flag are controlled by the flag judgment unit 55D. The outputs of the flag judgment unit 55D determining the operations are summarized in Table 2 as follows.

TABLE 2

|  | Valid/invalid | | | |
| --- | --- | --- | --- | --- |
|  | 1 Comparison output | | 0 Comparison output | |
|  | Match | Mismatch | Match | Mismatch |
| Invalid --> Valid | 1 | 0 | 0 | 1 | 0 |
|  | 0 | 0 | 0 | 1 | 1 |
| Valid --> Invalid | 1 | 1 | 0 | 0 | 0 |
|  | 0 | 1 | 1 | 0 | 0 |

A command's code portion of 40h is a command for changing the state of the valid/invalid flag 55A. As described above, only if the switch 3 is put in an ON state, can the valid/invalid flag 55A be changed from the communication unit 51.

In accordance with the above mechanism, it is possible to set conditions for entering a pass-code in a variety of combinations. For example, in order to change a pass-code from an invalid state to a valid state in an operation to change a pass-code, it is not necessary to enter a pass-code. In order to change a pass-code from a valid state to an invalid state, on the other hand, it is necessary to enter a pass-code.

By carrying out the operations described above, the switch 1 can be put in an ON state connecting the data-holding unit 52 to the communication unit 51. With the data-holding unit 52 connected to the communication unit 51, the external apparatus 100 is capable of reading out data from a predetermined location in the data-holding unit 52 a command code of 20h or writing data into a predetermined location in the data-holding unit 52 by a command code of 30h.

A pass-code already stored in the pass-code-holding unit 53 can be renewed by using a command code of 18h. In this case, an operation to renew a pass-code is controlled by using a switch 4.

As described earlier, the present embodiment is controlled by flag judgment unit 55D in accordance with the state of the invalid-to-valid flag 55B and the valid-to-invalid flag 55C, the state of the valid/invalid flag 55A, and the output of the pass-code-comparison unit 54. Thus, the control condition of the switch 4 can be changed in accordance with the states of the flags. For example, a pass-code already stored in the pass-code-holding unit 53 can be renewed when the invalid-to-valid flag 55B is changed from 0 to 1. By renewing a pass-code, valid identification of a pass-code can be based on a new pass-code without regard to a pass-code set before the new pass-code.

In the embodiment described above, by using a simple command, a setting can be changed. By inserting a mutual-authentication means into a path between the communication unit 51 and the external apparatus 100, the level of security can be raised.

Figure 9:
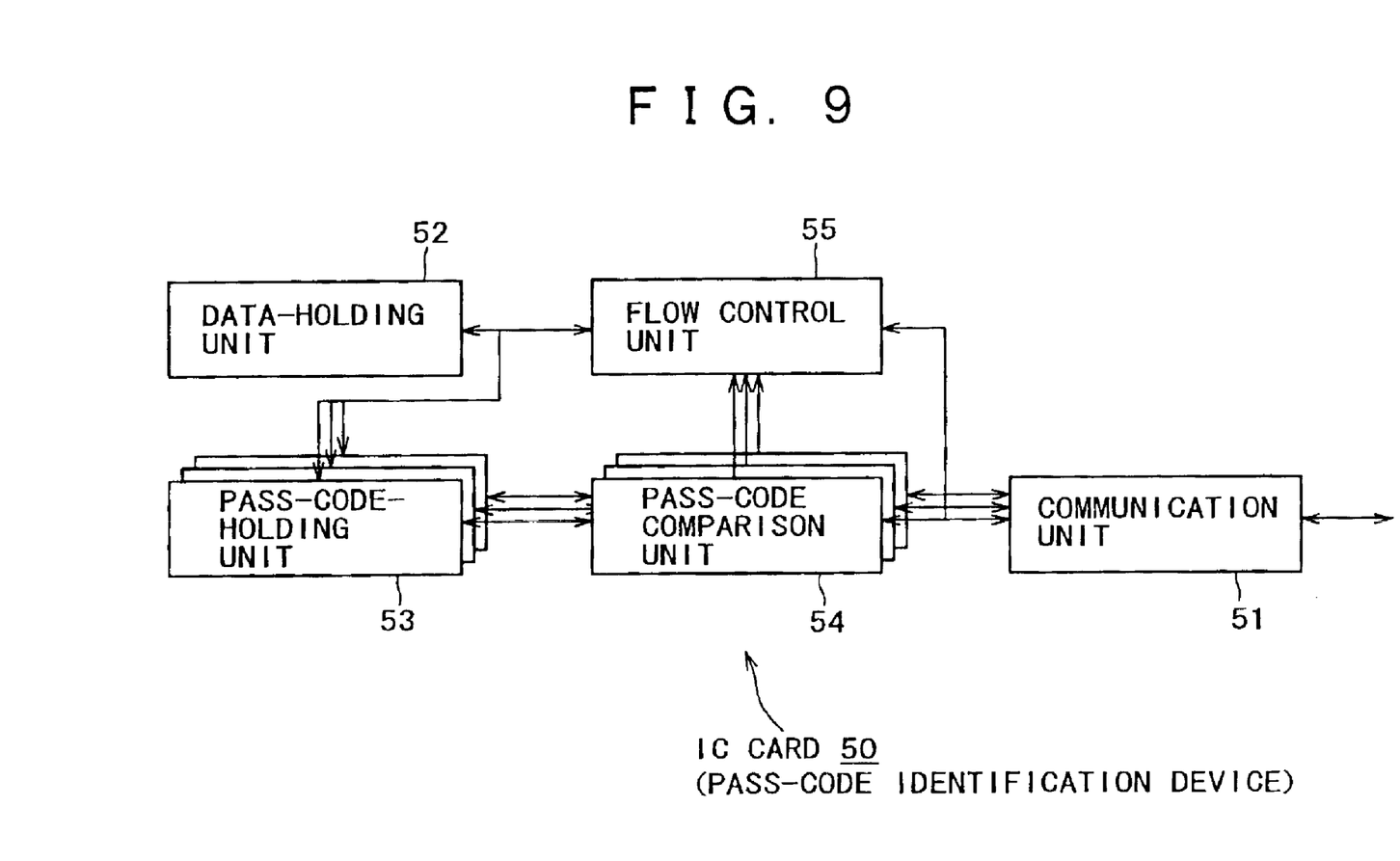
FIG. 9 is a block diagram showing a typical configuration of the pass-code identification device (the IC card 50) including a plurality of pass-code-holding units and a plurality of pass-code-comparison units.

The present invention can also be applied to an application in which accesses to the IC chip 50 are controlled by using a plurality of pass-codes assigned to the same plurality of applications stored in an extended memory employed in the IC chip 50. FIG. 9 shows a typical configuration the pass-code identification device (the IC card 50) including a plurality of pass-code-holding units and a plurality of pass-code-comparison units.

In the typical configuration shown in FIG. 9, the data-holding unit 52 is connected to the communication unit 51 only if all the pass-code-comparison units 54 each generate a match output. In this application, some external apparatuses each used for inputting a pass-code are each assigned to an individual user utilizing this system while some other external apparatuses each used for inputting a pass-code are each assigned to an operator such as a person in charge of card services. In this way, the functions of pass-codes can be controlled in accordance with a judgment formed by an operator. For example, the system can be set to forcibly require a pass-code input without regard to the wills of the individual users.

Figure 10:
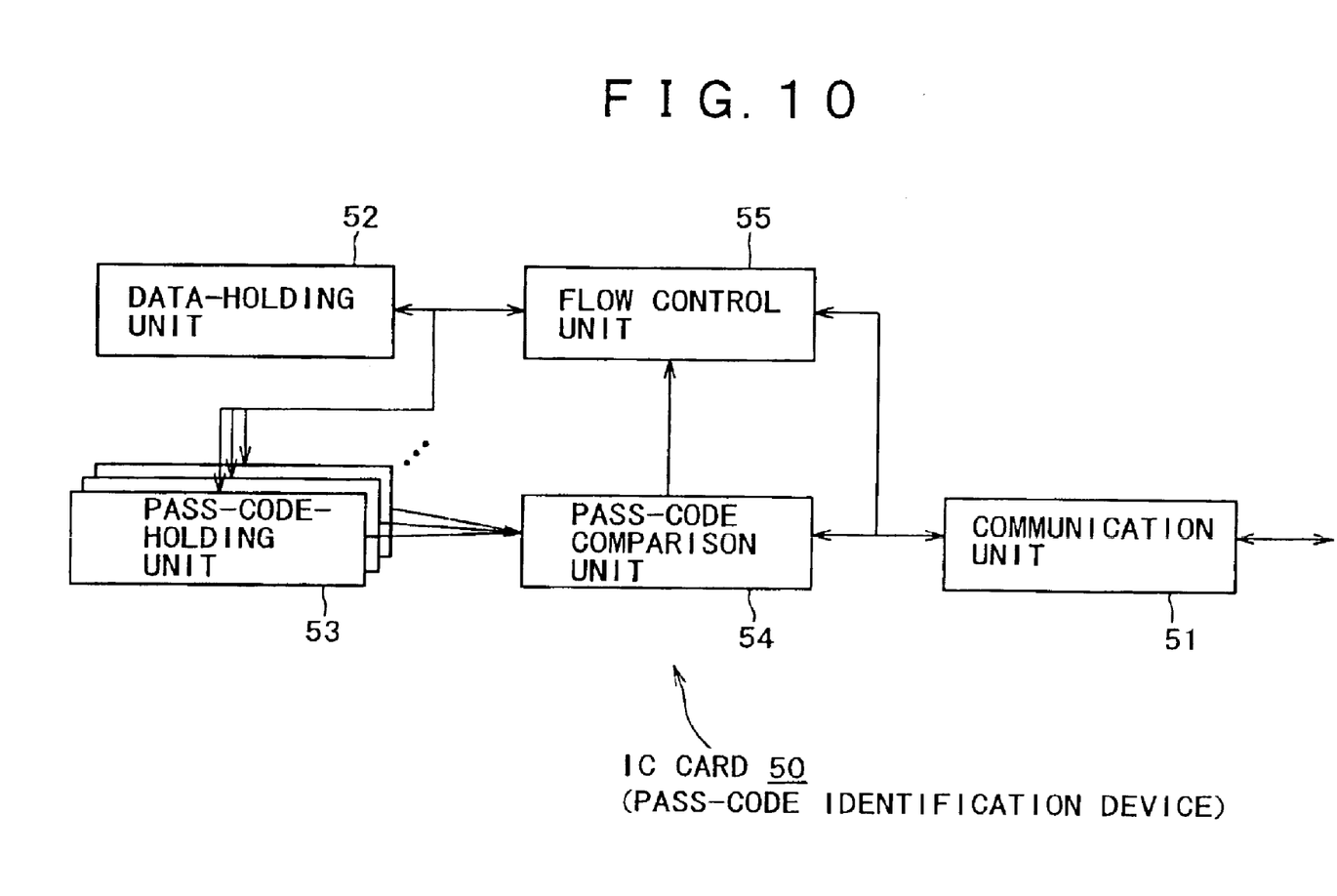
FIG. 10 is a block diagram showing a typical configuration of the pass-code identification device (the IC card 50) in which a pass-code can be set to each of the memory are in the data holding unit 52.

FIG. 10 shows a typical configuration of the pass-code identification device (the IC card 50) in which a pass-code can be set to each of the memory area in the data-holding unit 52.

The pass-code-comparison unit 54 has a lookup table showing relations between memory areas allocated to the data-holding unit 52 and pass-codes. It is thus possible to form a judgment as to whether or not a pass-code received from the communication unit 51 matches a pass-code to which any of the memory areas is allocated. If a pass-code received from the communication unit 51 matches a pass-code to which any specific one of the memory areas is allocated, an access to the specific memory area can be made. Table 3 shown below is a typical configuration of the lookup table managed by the pass-code-comparison unit 54.

TABLE 3

| Pass-code | Allowed memory start address | Allowed memory end address |
| --- | --- | --- |
| Pass-code 1 | 100 h | 180 h |
| Pass-code 2 | 300 h | 3A0 h |
| Pass-code 3 | | |

With such a configuration, the pass-code-comparison unit 54 compares a pass-code received from the communication unit 51 with every pass-code stored in the lookup table. It is then possible to make an access to a memory area of a memory space in the data-holding unit 52 if the memory area is allocated to a pass-code obtaining the match output.

Supplement

An embodiment of the present invention has been explained in detail so far. It is obvious, however, that a person skilled in the art is capable of making a variety of changes to the embodiment and designing a substitute for the embodiment within a range not departing from essentials of the present invention.

The embodiment explained in this specification implements a portable terminal such as a PDA and a portable telephone, which includes an embedded IC card provided by the present invention. However, the scope of the present invention is not limited to the embodiment. Also in the case of an IC card used as a standalone device or in the case of an IC card used as a device embedded in an apparatus having a different type, the effects of the present invention can be demonstrated as well.

In a word, the embodiment is no more than a typical implementation of the present invention and is therefore not to be interpreted as limitations to the present invention. That is to say, the scope of the present invention is defined by claims appended to this specification.

INDUSTRIAL APPLICABILITY

In accordance with an aspect of the present invention, it is possible to provide an excellent pass-code identification device and an excellent pass-code identification method that are capable of properly controlling accesses made by an external apparatus by collation of pass-codes.

In accordance with another aspect of the present invention, it is possible to provide a pass-code identification device and a pass-code identification method that are capable of appropriately controlling accesses made by an external apparatus such a reader/writer to an internal memory of the pass-code identification device such as an IC card by collation of pass-codes.

In accordance with a further aspect of the present invention, it is to provide a pass-code identification device and a pass-code identification method that allow to appropriately determine whether or not access-right control based on a pass-code is required.

What is claimed is:

1. A pass-code identification device for controlling accesses made by an external apparatus by collation of pass-codes, said pass-code identification device comprising:
   a communication unit for communicating with said external apparatus;
   a data-holding unit for holding data;
   a pass-code-holding unit for holding a pass-code;
   a pass-code judgment unit for forming a judgment as to whether or not an input pass-code received from said external apparatus matches said pass-code held by said pass-code holding unit;
   a condition-setting unit for setting a condition for forming said judgment on said input pass-code; and
   a flow control unit for controlling accesses made by said external apparatus to said data-holding unit through said communication unit in accordance with said condition for forming said judgment on said input pass-code, which is a condition set by said condition-setting unit,
   wherein said condition-setting unit comprises:
      first judgment-necessity-holding means for holding information indicating whether or not said pass-code judgment unit needs to form said judgment on said input pass-codes;
      second judgment-necessity-holding means for holding information indicating whether or not an input pass-code is required for chancing said first judgment-necessity-holding means from a state of holding information indicating that said pass-code judgment unit needs to form said judgment on aid input pass-code to a state of holding information indicating that said pass-code judgment unit does not need to form said judgment on said input pass-codes; and
      third judgment-necessity-holding means for holding information indicating whether or not an input pass-code is required for changing said first judgment-necessity-holding means from a state of holding information indicating that said pass-code judgment unit does not need to form said judgment on said input pass-code to a state of holding information indicating that said pass-code judgment unit needs to form said judgment on said input pass-code,
      said condition-setting unit sets a condition for forming said judgment on said input pass-code in accordance with said information held by aid first judgment-necessity-holding means, said information held by said second judgment-necessity-holding means and said information held by said third judgment-necessity-holding means.

2. A pass-code identification device according to claim 1 wherein:
   said condition-setting unit determines whether or not said pass-code judgment unit needs to form said judgment on said input pass-code; and
   said flow control unit permits an access made by said external apparatus to said data-holding unit through said communication unit if said condition-setting unit determines that said pass-code judgment unit does not need to form said judgment on said input pass-code or if said pass-code judgment unit outputs a judgment result revealing that said input pass-code matches said pass-code held by said pass-code-holding unit.

3. A pass-code identification device according to claim 1 wherein:
   if said condition-setting unit determines that said pass-code judgment unit does not need to form said judgment on said input pass-code, said flow control unit puts said data-holding unit in a state of being connected to said communication unit in order to permit an access made by said external apparatus to data held by said data holding unit; and
   if said condition-setting unit determines that said pass-code judgment unit needs to form said judgment on said input pass-code, on the other hand, said flow control unit puts said data-holding unit in a state of being connected to said communication unit in response to said pass-code judgment unit's output judgment result revealing that said input pass-code matches said stored pass-code in order to permit an access made by said external apparatus to data held by said data-holding unit.

4. A pass-code identification device according to claim 1 wherein:
   said pass-code-holding unit holds a plurality of pass-codes;
   said pass-code judgment unit forms a judgment as to whether or not an input pass-code received from said external apparatus through said communication unit matches each of said pass-codes held by said pass-code holding unit; and
   said flow control unit permits an access made by said external apparatus to said data-holding unit through said communication unit if said condition-setting unit determines that said pass-code judgment unit needs to form said judgment on said input pass-code and said pass-code judgment unit outputs a judgment result revealing that said input pass-code matches all said pass-codes held by said pass-code-holding unit.

5. A pass-code identification device according to claim 1 wherein:
   said pass-code-holding unit holds a plurality of pass-codes each associated with a memory area in said data-holding unit;
   said pass-code judgment unit forms a judgment as to whether or not an input pass-code received from said external apparatus matches each of said pass-codes held by said pass-code holding unit; and
   said flow control unit permits an access made by said external apparatus to a specific memory area of said data-holding unit through said communication unit if said condition-setting unit determines that said pass-code judgment unit needs form said judgment on said input pass-code and said pass-code judgment unit outputs a judgment result revealing that said input pass-code matches one of said stored pass codes that is associated with said specific memory area.

6. A pass-code identification method for controlling accesses made by an external apparatus to predetermined data by collation of pass-codes, said pass-code identification method comprising:

a pass-code judgment step of forming a judgment as to whether or not an input pass-code received from said external apparatus matches a pass-code set or said predetermined data;

a condition-setting step of setting a condition for forming said judgment on said input pass-code; and a flow control step of controlling accesses made by said external apparatus to said predetermined data in accordance with said condition for forming said judgment on said input pass-code, which is a condition set at said condition-setting step, wherein said condition-setting step comprises:

a first judgment-necessity-holding step of managing information indicating whether or not it is necessary to execute said pass-code judgment step of forming said judgment on said input pass-code;

a second judgment-necessity-holding step of managing information indicating whether or not an input pass-code is required for changing information from a value indicating that it is necessary to execute said pass-code judgment step of forming said judgment on said input pass-code to a value indicating that it is not necessary to execute said pass-code judgment step of forming said judgment on said input pass-code; and a third judgment-necessity-holding step of managing information indicating whether or not an input pass-code is required for changing information from a value indicating that it is not necessary to execute said pass-code judgment step of forming said judgment on said input pass-code to a value indicating that it is necessary to execute said pass-code judgment step of forming said judgment on said input pass-code, a condition for forming said judgment on said input pass-code is set in accordance with said information managed by said first judgment-necessity-holding step, said information managed by said second judgment-necessity-holding steps and said information managed by said third judgment-necessity-holding step.

7. A pass-code identification method according to claim 6 whereby:

said condition-setting step is executed also to determine whether not it is necessary to execute said pass-code judgment step of forming said judgment on said input pass-code; and at said flow control step, an access made by said external apparatus to said predetermined data is permitted if a result of execution of said condition-setting step indicates that said pass-code judgment step of forming said judgment on said input pass-code is not necessary or if a result of execution of said condition-setting step indicates that an output result of said judgment formed at said pass-code judgment step reveals that said input pass-code matches a pass-code set for said predetermined data.

8. A pass-code identification method according to claim 6 whereby:

a plurality of pass-codes is set for predetermined data to be access;

at said pass-code judgment step, a judgment as to whether or not input pass-code received from said external apparatus matches each of said pass-codes set for predetermined data is formed; and at said flow control step, an access made by said external apparatus to said predetermined data is permitted if a result of execution of said condition-setting step determines that it is necessary to execute said pass-code judgment step of forming said judgment on said input pass-code and an output result of said judgment formed at said pass-code judgment step reveals that said input pass-code matches all said pass-codes set for predetermined data.

9. A pass-code identification method according to claim 6 wherein:

a plurality of pass-codes are set, each being associated with a memory area;

at said pass-code judgment step, a judgment as to whether or not input pass-code received from said external apparatus matches each of said pass-codes each associated with a memory area is formed; and at said flow control step, an access made by said external apparatus to a specific memory area is permitted if a result of execution of said condition-setting step determines that it is necessary to execute said judgment on said input pass-code and output result of said judgment formed at said pass-code judgment step reveals that said input pass-code matches one of said stored pass-codes that is associated with said specific memory area.

10. A pass-code identification method for controlling accesses made by an external apparatus, said pass-code identification method comprising:

determining whether a pass-code judgment unit needs to form a judgment on a first pass-code of a plurality of pass-codes;

when it is determined that a pass-code judgment unit needs to form a judgment on said first pass-code, determining whether a first input pass-code received from said external apparatus matches said first pass-code;

when it is determined that said first input pass-code received from said external apparatus matches said first pass-code, allowing said external apparatus to access data corresponding to said first pass-code;

determining whether a second pass-code is required to change said pass-code judgment unit to not require a judgment on said first pass-code; and when it is determined that said second pass-code is required to change said pass-code judgment unit to not require a judgment on said first pass-code, determining whether a second input pass-code received from said external apparatus matches said second pass-code; and when it is determined that a second input pass-code received from said external apparatus matches said other pass-code, allowing said external apparatus to change said pass-code judgment unit to not require a judgment on said first pass-code; and when it is determined that the pass-code judgment unit does not need to form a judgment on said first pass-code, determining whether a third pass-code is required to change said pass-code judgment unit to require a judgment on said first pass-code; and when it is determined that said third pass-code is required to change said pass-code judgment unit to require a judgment on said first pass-code, determining whether said second input pass-code received from said external apparatus matches said third pass-code; and when it is determined that a said second input pass-code received from said external apparatus matches said third pass-code, allowing said external apparatus to change said pass-code judgment unit to require a judgment on said first pass-code.

11. A pass-code identification method according to claim 10, wherein said other pass-code comprises said first pass-code.

* * * * *